United States Patent
Fukunaga et al.

(10) Patent No.: US 9,645,443 B2
(45) Date of Patent: May 9, 2017

(54) REFLECTIVE LIQUID-CRYSTAL DISPLAY DEVICE AND ELECTRONIC APPARATUS

(71) Applicant: Japan Display Inc., Tokyo (JP)

(72) Inventors: Yoko Fukunaga, Tokyo (JP); Susumu Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 122 days.

(21) Appl. No.: 14/219,227

(22) Filed: Mar. 19, 2014

(65) Prior Publication Data

US 2014/0293189 A1    Oct. 2, 2014

(30) Foreign Application Priority Data

Mar. 27, 2013   (JP) .................... 2013-067469

(51) Int. Cl.
    *G02F 1/1335*    (2006.01)
    *F21V 8/00*       (2006.01)

(52) U.S. Cl.
    CPC ..... *G02F 1/133606* (2013.01); *G02B 6/0038* (2013.01); *G02F 1/133553* (2013.01); *G02B 6/0051* (2013.01); *G02F 1/133504* (2013.01); *G02F 2001/133616* (2013.01)

(58) Field of Classification Search
    None
    See application file for complete search history.

(56) References Cited

U.S. PATENT DOCUMENTS

| 6,661,483 | B1 * | 12/2003 | Moriwaki et al. ............ 349/102 |
| 6,686,981 | B2 * | 2/2004  | Noritake .......... G02F 1/133553 349/113 |
| 7,209,107 | B2 * | 4/2007  | Ohmuro et al. ................ 345/92 |
| 7,714,956 | B2   | 5/2010  | Sawayama et al. |
| 2002/0054033 | A1 * | 5/2002 | Nakamura et al. ........... 345/204 |

(Continued)

FOREIGN PATENT DOCUMENTS

| JP | 10-123510 | 5/1998 |
| JP | 11-064818 | 3/1999 |

(Continued)

OTHER PUBLICATIONS

Notice of Rejection issued in connection with Japanese Patent Application 2013-067469, dated Jul. 21, 2015. (10 pages).

(Continued)

*Primary Examiner* — Dung Nguyen
*Assistant Examiner* — Shan Liu
(74) *Attorney, Agent, or Firm* — K&L Gates LLP

(57) ABSTRACT

According to an aspect, a reflective liquid-crystal display device includes a liquid-crystal panel and a front light unit. The liquid-crystal panel includes a sheet-like anisotropic scattering member having low refractive index areas and high refractive index areas with a refractive index higher than that of the low refractive index areas. The front light unit includes a light guide plate laminated on the liquid-crystal panel and having a number of grooves formed on a surface facing the liquid-crystal panel at a pitch of equal to or smaller than 100 □m and a light source that makes light incident on the light guide plate. An arrangement interval of the unit pixels is larger than an average of an arrangement interval of the high refractive index area of the anisotropic scattering member.

7 Claims, 15 Drawing Sheets

(56) References Cited

U.S. PATENT DOCUMENTS

| | | | |
|---|---|---|---|
| 2003/0174261 A1* | 9/2003 | Sugiura | G02B 6/0028 349/65 |
| 2003/0174492 A1* | 9/2003 | Ohkawa | G02B 6/0016 362/612 |
| 2003/0227768 A1* | 12/2003 | Hara | G02B 6/0031 362/613 |
| 2004/0165370 A1* | 8/2004 | Kano et al. | 362/31 |
| 2006/0007302 A1* | 1/2006 | Numata | G02F 1/133524 348/71 |
| 2006/0098280 A1* | 5/2006 | Yamauchi | G03B 21/60 359/454 |
| 2007/0064180 A1* | 3/2007 | Hasegawa | G02F 1/133504 349/112 |
| 2009/0052045 A1* | 2/2009 | Coyle | G02B 5/045 359/625 |
| 2013/0088785 A1* | 4/2013 | Yamamoto | G02B 17/002 359/639 |
| 2014/0340753 A1* | 11/2014 | Kusama et al. | 359/599 |

FOREIGN PATENT DOCUMENTS

| | | |
|---|---|---|
| JP | 2000-121837 | 4/2000 |
| JP | 2001-345008 | 12/2001 |
| JP | 2003-519817 | 6/2003 |
| JP | 2003-255316 | 9/2003 |
| JP | 2004-006128 | 1/2004 |
| JP | 2005-148525 | 6/2005 |
| JP | 2013-041107 | 2/2013 |

OTHER PUBLICATIONS

Japanese Office Action issued Feb. 23, 2016 in corresponding Japanese Application No. 2013-067469.
Chinese Office Action issued May 5, 2016 in corresponding Chinese Application No. 201410117682.4.

* cited by examiner

REFLECTIVE LIQUID-CRYSTAL DISPLAY DEVICE AND ELECTRONIC APPARATUS

CROSS REFERENCES TO RELATED APPLICATIONS

The present application claims priority to Japanese Priority Patent Application JP 2013-067469 filed in the Japan Patent Office on Mar. 27, 2013, the entire content of which is hereby incorporated by reference.

BACKGROUND

1. Technical Field

The present disclosure relates to a reflective liquid-crystal display device and an electronic apparatus including the same.

2. Description of the Related Art

There have been developed some types of display devices, including transmissive display devices and reflective display devices. Transmissive display devices perform display using transmitted light of backlight output from the back surface of a screen. Reflective display devices perform display using reflected light of external light. Reflective display devices have characteristics in that less power consumption is required and that the screen is easy to see under a bright environment.

Some reflective display devices are provided with a front light unit that makes light incident from a video display surface side so as to make the reflective display devices available in a place with no or less external light (refer to Japanese Patent Application Laid-open Publication No. 2004-6128 (JP-A-2004-6128) and Japanese Patent Application Laid-open Publication No. 2001-345008 (JP-A-2001-345008)). JP-A-2004-6128, for example, discloses a front lighting system. The front lighting system is provided with a light guide including an incident unit on which light is incident from a light source and a reflecting unit that reflects the light output from the light source toward an object to be illuminated. The front lighting system is used in a manner arranged in front of the object to be illuminated. The front lighting system is further provided with a diffusion unit that diffuses the reflected light received from the reflecting unit between the incident unit and the reflecting unit.

By arranging such a front light unit on the side of a liquid-crystal display panel that displays an image, that is, on the display surface side, making light incident on the liquid-crystal display panel from the front light unit, and reflecting the light by using a reflective electrode, a reflective liquid-crystal display device can output light from the display surface when external light is insufficient. Because the light can be incident in the same direction as in the case where external light is used, it is possible to use the light efficiently.

The front light unit includes a light source and a light guide plate. The light guide plate is laminated on the display surface of the liquid-crystal display panel to scatter and reflect light output from the light source, thereby making the light incident on the liquid-crystal display panel, for example. Some light guide plates have recesses and protrusions formed on a surface parallel to the display surface to make light entering from the light source arranged on the side surface and traveling along the display surface incident on the liquid-crystal display panel. In recent years, fine recesses and protrusions can be formed on the surface to further average the light output from the light source and reflect the light to the liquid-crystal display panel, thereby improving the optical characteristics. However, if the reflective liquid-crystal display device is provided with a front light unit including a light guide plate having fine recesses formed on its surface, moire may possibly occur in a displayed image.

For the foregoing reasons, there is a need for a need for a reflective liquid-crystal display device that can suppress moire and an electronic apparatus including the same.

SUMMARY

According to an aspect, a reflective liquid-crystal display device includes a liquid-crystal panel and a front light unit. The liquid-crystal panel includes a reflective electrode provided for each of a plurality of units, a first substrate provided with the reflective electrode, a transparent electrode facing the reflective electrode, a second substrate provided with the transparent electrode, a liquid-crystal layer provided between the first substrate and the second substrate, and a sheet-like anisotropic scattering member laminated on the second substrate and having low refractive index areas and high refractive index areas with a refractive index higher than that of the low refractive index areas. The front light unit includes a light guide plate laminated on a surface on the second substrate side of the liquid-crystal panel and having a number of grooves formed on a surface facing the liquid-crystal panel at a pitch of equal to or smaller than 100 µm and a light source that makes light incident on the light guide plate. An arrangement interval of the unit pixels is larger than an average of an arrangement interval of the high refractive index area of the anisotropic scattering member.

According to another aspect, an electronic apparatus includes the reflective liquid-crystal display device.

Additional features and advantages are described herein, and will be apparent from the following Detailed Description and the figures.

DETAILED DESCRIPTION

Figure 1:
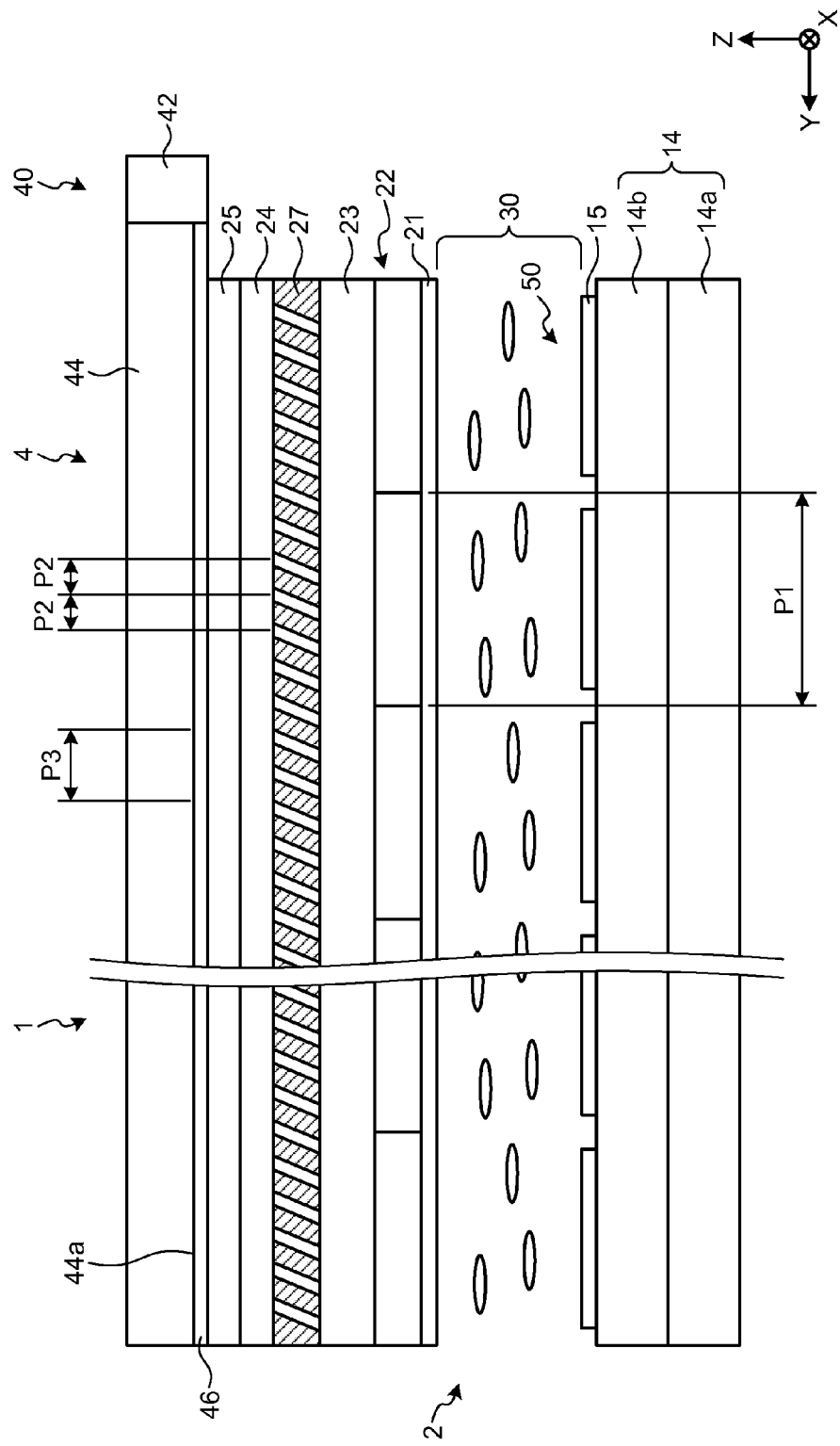
FIG. 1 is a sectional view schematically illustrating a configuration of a reflective LCD device to which the present disclosure is applied.

Modes for embodying technologies according to the present disclosure (hereinafter, referred to as "embodiments") are described below in detail with reference to the accompanying drawings in the following order:

1. Reflective LCD device to which the present disclosure is applied
   1-1. Reflective LCD device supporting color display
   1-2. Basic pixel circuit
   1-3. Pixel and a sub-pixel
   1-4. Electrode structure of a pixel unit
   1-5. Method for driving an LCD panel
   1-6. Anisotropic scattering member
   1-7. Front light unit
   1-8. Functions of the reflective LCD device
2. Electronic apparatuses
3. Aspects of the present disclosure 1. Reflective LCD Device to which the Present Disclosure is Applied The technologies according to the present disclosure are applicable to flat-panel (flat) display devices. Examples of the flat-panel display devices include, but are not limited to, display devices provided with a liquid-crystal display (LCD) panel etc.

These flat-panel display devices can be classified into transmissive display devices and reflective display devices by their display modes. The technologies according to the present disclosure are applicable to reflective display devices. Reflective LCD devices are preferably used as a display unit of electronic apparatuses, specifically, of portable electronic apparatuses frequently used outdoors, that is, portable electronic apparatuses including portable information apparatuses, such as digital cameras, and portable communication apparatuses, such as mobile phones.

A reflective LCD device to which the present disclosure is applied may be a display device supporting monochrome display or a display device supporting color display. If the reflective LCD device supports color display, one display pixel serving as a unit that constitutes a color image includes a plurality of sub-pixels. More specifically, in the display device supporting color display, one display pixel includes three sub-pixels of a sub-pixel that displays red (R), a sub-pixel that displays green (G), and a sub-pixel that displays blue (B), for example.

The pixel is not necessarily formed by combining sub-pixels of the three primary colors of RGB. The display pixel may be formed by adding a sub-pixel of one color or sub-pixels of a plurality of colors to the sub-pixels of the three primary colors of RGB. More specifically, the display pixel may be formed by adding a sub-pixel that displays white (W) to increase the luminance or adding at least one sub-pixel that displays a complementary color to expand a color extension range, for example. To display a gradation with a sub-pixel, the sub-pixel may include a plurality of sub-sub-pixels. In the present embodiment, a pixel of the smallest unit among the display pixel, the sub-pixel, the sub-sub-pixel, and the like is defined as a unit pixel. In other words, the smallest electrode area that can switch between display and non-display is defined as a unit pixel.

1-1. Reflective LCD Device Supporting Color Display

The following describes a reflective LCD device supporting color display as an example of the reflective LCD device to which the present disclosure is applied with reference to the accompanying drawings.

FIG. 1 is a sectional view schematically illustrating a configuration of the reflective LCD device to which the present disclosure is applied. As illustrated in FIG. 1, a reflective LCD device 1 includes a reflective LCD panel 2 and a front light unit 4. The front light unit 4 is arranged on the side of a surface that displays an image of the reflective LCD panel 2. In the present embodiment, an X-direction represents a direction in which a light source 40 of the front light unit 4 is arrayed, that is, a longitudinal direction of a side surface of the light guide plate 44 on which light output from the light source 40 is incident. A Y-direction represents a direction in which the light output from the light source 40 is incident. A Z-direction represents a direction in which the reflective LCD panel 2 and the front light unit 4 are laminated.

Figure 2:
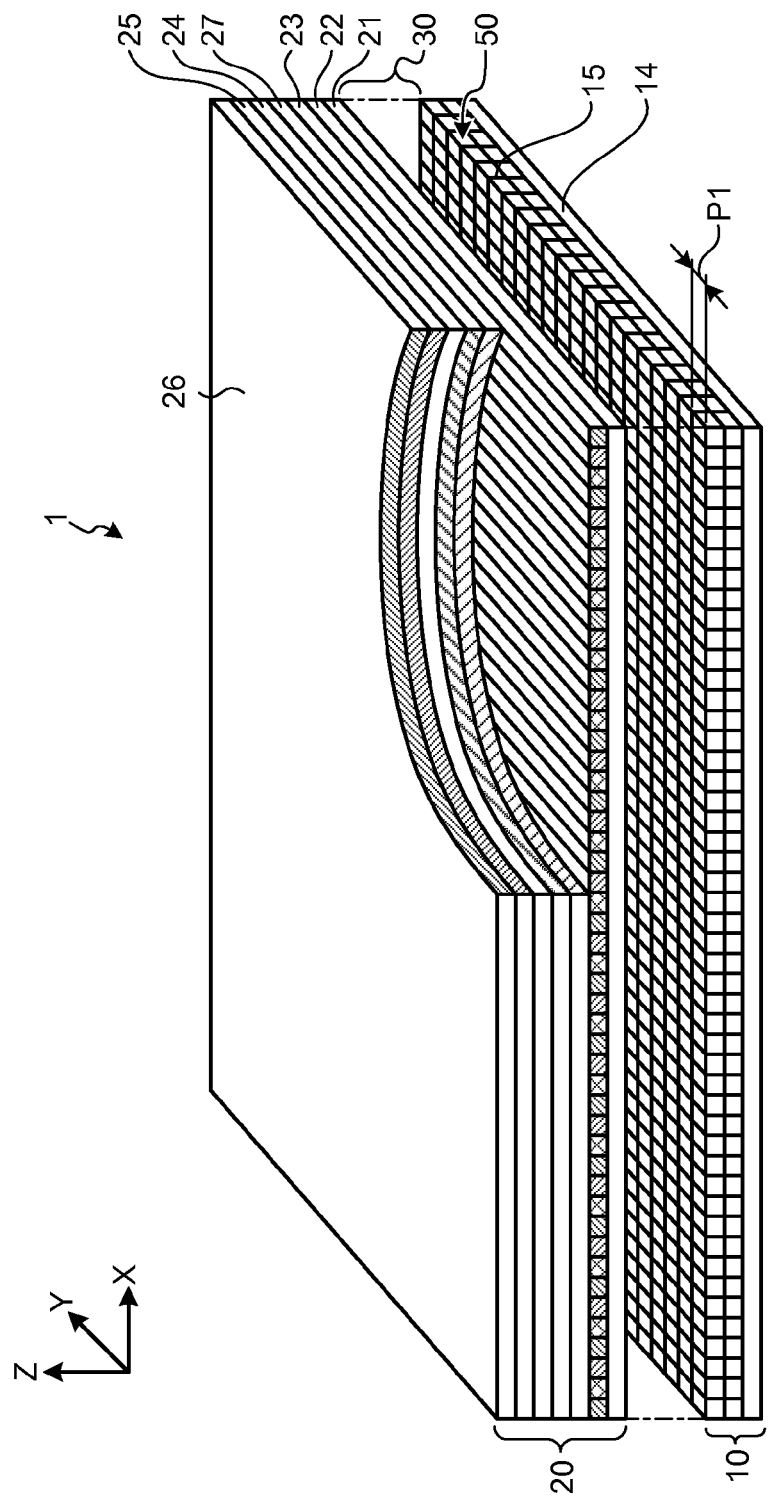
FIG. 2 is a perspective view schematically illustrating a configuration of a reflective LCD panel to which the present disclosure is applied with a part thereof cut out.

As illustrated in FIG. 1 and FIG. 2, the reflective LCD panel 2 to which the present disclosure is applied includes a first panel unit (a thin film transistor (TFT) substrate) 10, a second panel unit (a CF substrate) 20, and a liquid-crystal layer 30 as main components. The surface of the second panel unit 20 serves as a display surface of the reflective LCD panel 2. The first panel unit 10 and the second panel unit 20 are arranged in a manner facing each other with a predetermined gap interposed therebetween. By filling the gap between the first panel unit 10 and the second panel unit 20 with a liquid-crystal material, the liquid-crystal layer 30 is formed.

The first panel unit 10 includes a first substrate 14 and reflective electrodes 15 arranged in this order from the side opposite to the liquid-crystal layer 30. The first substrate 14 is made of a substrate material such as transparent glass. The reflective electrodes 15 are formed on the liquid-crystal later 30 side of the first substrate 14. The reflective electrodes 15 each serve as a part of a sub-pixel 50. In the present embodiment, P1 denotes an arrangement interval between the sub-pixels 50 adjacent in the Y-direction, that is, an interval between the adjacent unit pixels. The arrangement interval between the sub-pixels 50 corresponds to a distance between the boundaries of the sub-pixels 50 adjacent in the Y-direction on one side thereof. A distance between the centers of the adjacent sub-pixels 50 is also represented by P1.

In the first panel unit 10, the first substrate 14 is formed of a circuit board 14a and a planarizing film 14b laminated thereon. The circuit board 14a is provided with a plurality of signal lines and a plurality of scanning lines, neither of which is illustrated, formed above a glass substrate in a manner intersecting with each other. The sub-pixels (hereinafter, which may be simply referred to as "pixels") 50 are two-dimensionally arranged in a matrix at portions where the signal lines and the scanning lines intersect with each other.

Circuit elements including switching elements, such as TFTs, and capacitive elements are formed above the circuit board 14a for each pixel 50. The planarizing film 14b is formed on the surface of the circuit elements, the signal lines, and the scanning lines of the first substrate 14, thereby planarizing the surface of the first panel unit 10. The reflective electrodes 15 are formed on the planarizing film for each pixel 50. Because the circuit elements including the TFTs are formed in the first substrate 14, the first substrate 14 is referred to also as a TFT substrate. The first substrate 14 is provided with the circuit board 14a formed of a glass substrate on which respective units are formed. Instead of the glass substrate, a substrate made of a material other than glass may be used. Alternatively, the circuit board 14a may be formed of a substrate made of a material that blocks light or a material that reflects light.

The signal lines are wiring that transmits a signal (a display signal or a video signal) for driving the pixels 50. The signal lines have a wiring structure in which they are arranged for each pixel column with respect to the matrix arrangement of the pixels 50, and each extending along an arrangement direction of pixels of the corresponding pixel column, that is, along a column direction (Y-direction in FIG. 2). The scanning lines are wiring that transmits a signal (a scanning signal) for selecting the pixels 50 for each row. The scanning lines have a wiring structure in which they are arranged for each pixel row with respect to the matrix arrangement of the pixels 50, and each extending along an arrangement direction of pixels of the corresponding pixel row, that is, along a row direction (X-direction in FIG. 2). The X-direction and the Y-direction are orthogonal to each other.

The second panel unit 20 includes a transparent electrode 21 made of an indium tin oxide (ITO) and the like, a color filter 22, a second substrate 23 made of a substrate material such as transparent glass, a quarter-wave plate 24, a half-wave plate 25, and a polarizing plate 26 arranged in this order from the liquid-crystal layer 30 side. An anisotropic scattering member (LCF) 27 is provided between the second substrate 23 and the quarter-wave plate 24 in the second panel unit 20.

In the second panel unit 20, the color filter 22 has a structure in which filters in stripes of red (R), green (G), and blue (B) extending in the column direction (Y-direction) are repeatedly arranged at the same pitch as that of the pixels 50 in the row direction (X-direction), for example. Because the second substrate 23 includes the color filter (CF) 22, the second substrate 23 is referred to also as a CF substrate.

The LCD panel is formed of the first panel unit 10, the second panel unit 20 arranged in a manner facing the first panel unit 10, and the liquid-crystal layer 30 arranged between the first panel unit 10 and the second panel unit 20. The top surface (surface) of the second panel unit 20 serves as the display surface.

In the reflective LCD panel 2 having the configuration described above, the pixels 50 each have a reflective display area (a reflective display unit). The reflective display area includes the reflective electrode 15 formed for each pixel 50 on the surface of the planarizing film of the first substrate 14 as described above. The reflective display area reflects external light passing through the second panel unit 20 and incident from the outside with the reflective electrode 15, thereby performing display with the reflected light.

1-2. Basic Pixel Circuit

Figure 3A:
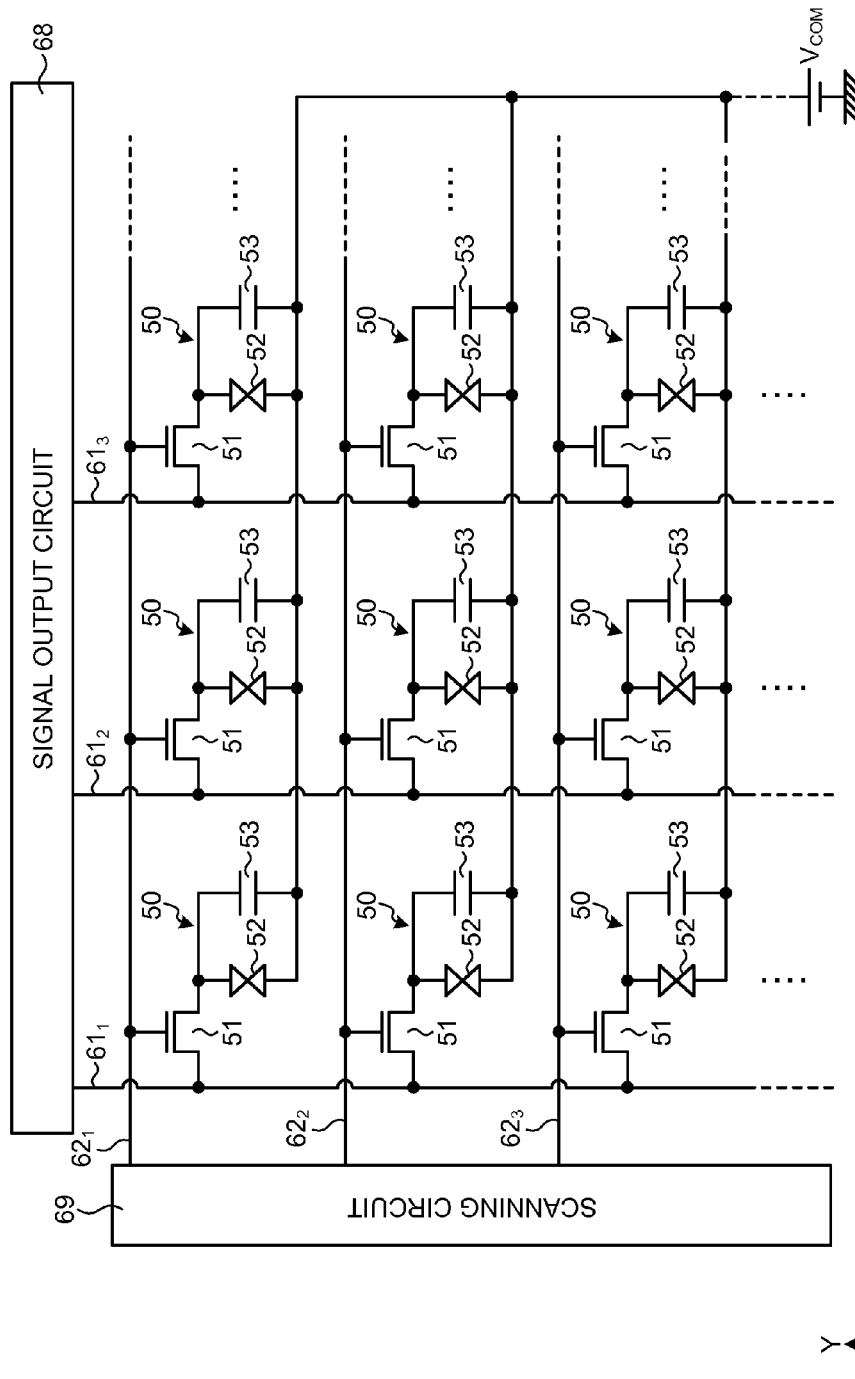
FIG. 3A is a circuit diagram of a basic pixel circuit.

A basic pixel circuit of the pixel 50 will now be described with reference to FIG. 3A. In FIG. 3A, a direction indicated by X (X-direction) represents the row direction of the reflective LCD device 1 illustrated in FIG. 2, and a direction indicated by Y (Y-direction) represents the column direction thereof.

As illustrated in FIG. 3A, a plurality of signal lines 61 ($61_1$, $61_2$, $61_3$, . . . ) and a plurality of scanning lines 62 ($62_1$, $62_2$, $62_3$, . . . ) are arranged in a manner intersecting with each other. The pixels 50 are arranged at the intersections. The scanning lines 62 ($62_1$, $62_2$, $62_3$, . . . ) extend in the row direction (X-direction), whereas the signal lines 61 ($61_1$, $61_2$, $61_3$, . . . ) extend in the column direction (Y-direction). As described above, the signal lines 61 and the scanning lines 62 are formed above the surface of the first substrate (TFT substrate) 14 of the first panel unit 10. One end of each signal line 61 ($61_1$, $61_2$, $61_3$, . . . ) is coupled to a corresponding output terminal of a signal output circuit 68. One end of each scanning line 62 ($62_1$, $62_2$, $62_3$, . . . ) is coupled to a corresponding output terminal of a scanning circuit 69.

Each pixel 50 includes a pixel transistor 51 formed of a TFT, a liquid-crystal capacity 52, and a storage capacitor 53, for example. In the pixel transistor 51, a gate electrode is coupled to one of the scanning lines 62 ($62_1$, $62_2$, $62_3$, . . . ), and a source electrode is coupled to one of the signal lines 61 ($61_1$, $61_2$, $61_3$, . . . ).

The liquid-crystal capacity 52 is a capacitive component of the liquid-crystal material generated between a pixel electrode and a counter electrode (corresponding to the transparent electrode 21 in FIG. 2) formed in a manner facing the pixel electrode. The pixel electrode is coupled to a drain electrode of the pixel transistor 51. The pixel electrode corresponds to a reflective electrode formed for each sub-pixel in color display and to a reflective electrode formed for each pixel in monochrome display. A common potential $V_{COM}$ of a direct-current (DC) voltage is applied to the counter electrode of the liquid-crystal capacity 52 in common to all the pixels. In the storage capacitor 53, one electrode is coupled to the pixel electrode of the liquid-crystal capacity 52, and the other electrode is coupled to the counter electrode of the liquid-crystal capacity 52.

As is clear from the pixel circuit described above, the signal lines 61 ($61_1$, $61_2$, $61_3$, . . . ) are wiring that transmits a signal for driving the pixels 50, that is, a video signal output from the signal output circuit 68 to the pixels 50 in each pixel column. The scanning lines 62 ($62_1$, $62_2$, $62_3$, . . . ) are wiring that transmits a signal for selecting the pixels 50 for each row, that is, a scanning signal output from the scanning circuit 69 to each pixel row.

1-3. Pixel and a Sub-Pixel

Figure 3B:
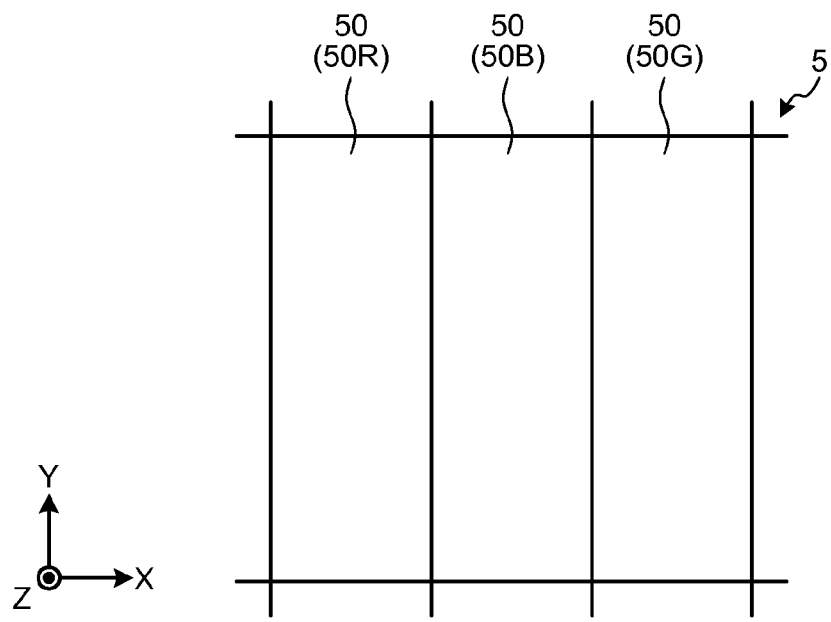
FIG. 3B is a schematic of pixels in color display.

In the case where the reflective LCD device 1 supports color display, one pixel serving as a unit that renders a color image, that is, a color pixel 5 includes a plurality of sub-pixels 50 as illustrated in FIG. 3B, for example. In this example, the color pixel 5 includes a sub-pixel 50R that displays R, a sub-pixel 50B that displays B, and a sub-pixel 50G that displays G. The sub-pixels 50R, 50B, and 50G included in the color pixel 5 are arrayed in the X-direction, that is, in the row direction of the reflective LCD device 1.

Figure 3C:
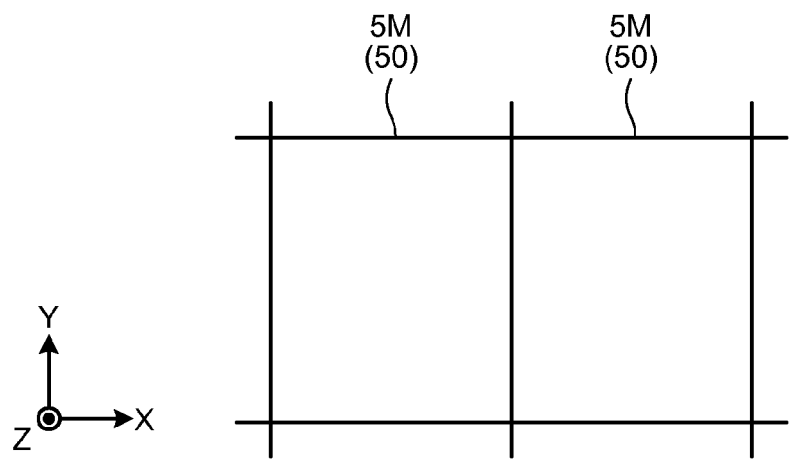
FIG. 3C is a schematic of pixels in monochrome display.

The color pixel 5 may further includes a sub-pixel of one color or sub-pixels of a plurality of colors as described above. In the case where the reflective LCD device 1 supports monochrome display alone, one pixel serving as a unit that renders a monochrome image, that is, a monochrome pixel 5M is the pixel 50 (corresponding to the sub-pixel 50 in a color image) as illustrated in FIG. 3C. The color pixel 5 is a basic unit for displaying a color image, whereas the monochrome pixel 5M is a basic unit for displaying a monochrome image.

1-4. Electrode Structure of a Pixel Unit

Figure 4:
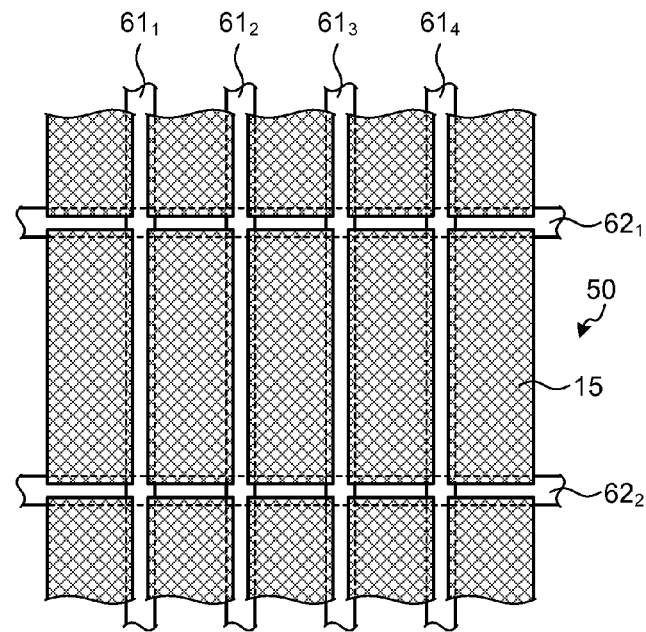
FIG. 4 is a plan view of a pixel unit of the reflective LCD device.

An electrode structure of the pixel 50 will be described. FIG. 4 is a view for explaining an electrode structure of a pixel unit. FIG. 4 is a plan view of the pixel unit of the reflective (total reflective) LCD device. In FIG. 4, the reflective electrode 15 is indicated by hatching.

As illustrated in FIG. 4, the pixel unit of the reflective LCD device 1 has the following configuration: the pixels 50 are arranged in a matrix; the signal lines 61 are arranged at spatial positions between the pixels 50 extending along the column direction in the matrix array; and the scanning lines 62 are arranged at spatial positions between the pixels 50 extending along the row direction. As described above, the signal lines 61 and the scanning lines 62 are arranged in a manner intersecting with each other above the first substrate 14 of the first panel unit 10 in FIG. 2.

In the pixel unit (pixel array unit) having such a configuration, the reflective LCD device 1 illustrated in FIG. 4 has the reflective electrode 15 made of a metal, such as aluminum, and formed in substantially the same size as that of the pixel 50. The reflective LCD device 1 uses the area of the reflective electrode 15 as the reflective display area. In other words, the reflective LCD device 1 secures the reflective display area having substantially the same size as that of the pixel 50, thereby providing desired reflective display performance.

1-5. Method for Driving an LCD Panel

In LCD panels (LCD devices), continuous application of a DC voltage of the same polarity to the liquid crystal deteriorates the resistivity (substance-specific resistance) and the like of the liquid crystal. To suppress the deterioration, LCD panels (LCD devices) employ a driving method for inverting the polarity of video signals at a predetermined period with respect to the common potential.

Some types of methods for driving an LCD panel are known, including line inversion driving method, dot inversion driving method, and frame inversion driving method. The line inversion driving method is a driving method for inverting the polarity of video signals at a time period of 1H (H represents a horizontal period) corresponding to one line (one pixel row). The dot inversion driving method is a driving method for alternately inverting the polarity of video signals for pixels vertically and horizontally adjacent to each other. The frame inversion driving method is a driving method for inverting the polarity of video signals to be written to all the pixels in one frame corresponding to one screen with the same polarity at a time.

In the frame inversion driving method, the reflective LCD device 1 applies a signal voltage of the same polarity to the signal lines during one frame period. As a result, shading may possibly occur. To address this, the reflective LCD device 1 is provided with what is called a memory in pixel (MIP) technology to perform the frame inversion driving method. The MIP technology uses pixels having a memory function, that is, pixels each provided with a memory capable of storing therein data as the pixels 50, for example.

The MIP technology constantly applies a steady voltage to the pixels 50, thereby reducing the shading.

In the MIP technology, the pixels each have a memory that stores therein data. This enables display in an analog display mode and display in a memory display mode. The analog display mode is a display mode for displaying the gradation of a pixel in an analog manner. The memory display mode is a display mode for displaying the gradation of a pixel in a digital manner based on binary information (logic "1"/logic "0") stored in the memory in the pixel.

Because the memory display mode uses the information stored in the memory, it is not necessary to perform a writing operation of a signal potential reflecting the gradation at a frame period. As a result, the memory display mode requires lower power consumption than the analog display mode that needs to perform a writing operation of a signal potential reflecting the gradation at a frame period. In other words, it is possible to reduce the power consumption of the reflective LCD device 1. A static random access memory (SRAM) is given just as an example, and another memory, such as a dynamic random access memory (DRAM), may be used.

To employ the MIP technology, the present embodiment can use an area coverage modulation method or a time division modulation method, for example. In the time division modulation method, the pixel potential varies with time even when a still image is displayed, thereby causing liquid-crystal molecules in a pixel and between pixels to move. Accordingly, the area coverage modulation method is more preferably used than the time division modulation method.

While a pixel of MIP having a memory capable of storing therein data is used as the pixel having a memory function in the description above, this is given just as an example. Examples of the pixel having a memory function include, but are not limited to, a pixel provided with a well-known memory liquid crystal etc. besides the pixel of MIP.

Display modes of a liquid crystal include a normally white mode and a normally black mode. In the normally white mode, application of no electric field (voltage) causes the liquid crystal to perform white display, and application of an electric field causes the liquid crystal to perform black display. In the normally black mode, application of no electric field causes the liquid crystal to perform black display, and application of an electric field causes the liquid crystal to perform white display. The modes are the same in the structure of the liquid-crystal cell and different in the arrangement of the polarizing plate 26 illustrated in FIG. 2. The reflective LCD device 1 according to the present embodiment is driven in the normally white mode in which application of no electric field (voltage) causes the liquid crystal to perform white display and application of an electric field causes the liquid crystal to perform black display.

1-6. Anisotropic Scattering Member

Figure 5:
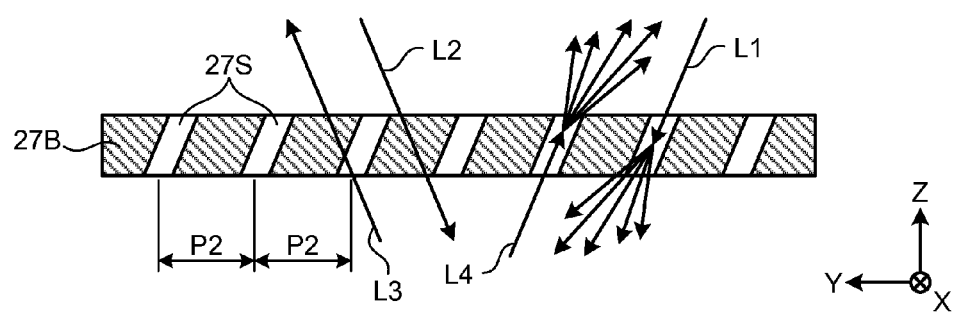
FIG. 5 is a sectional view of an anisotropic scattering member.
Figure 6:
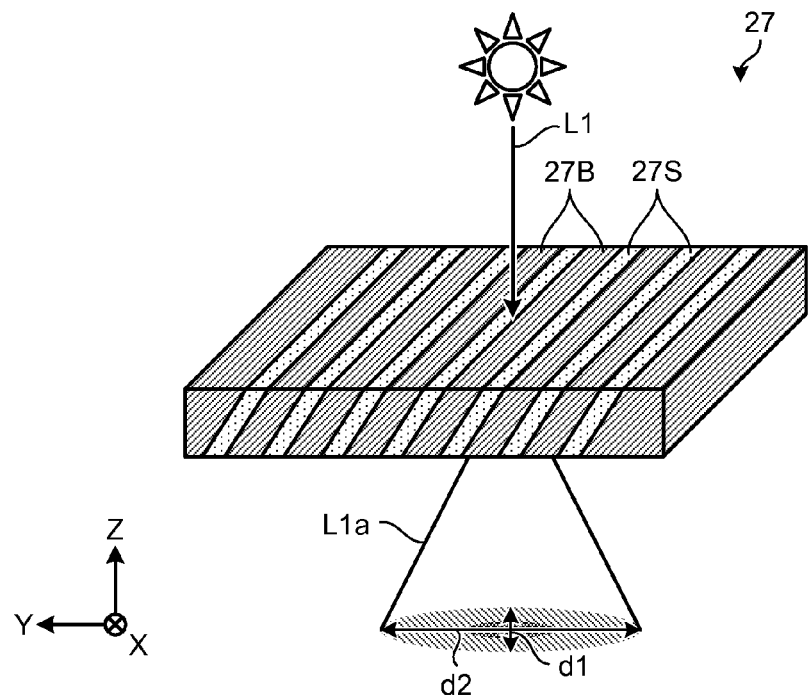
FIG. 6 is a schematic for explaining a function of the anisotropic scattering member.
Figure 7:
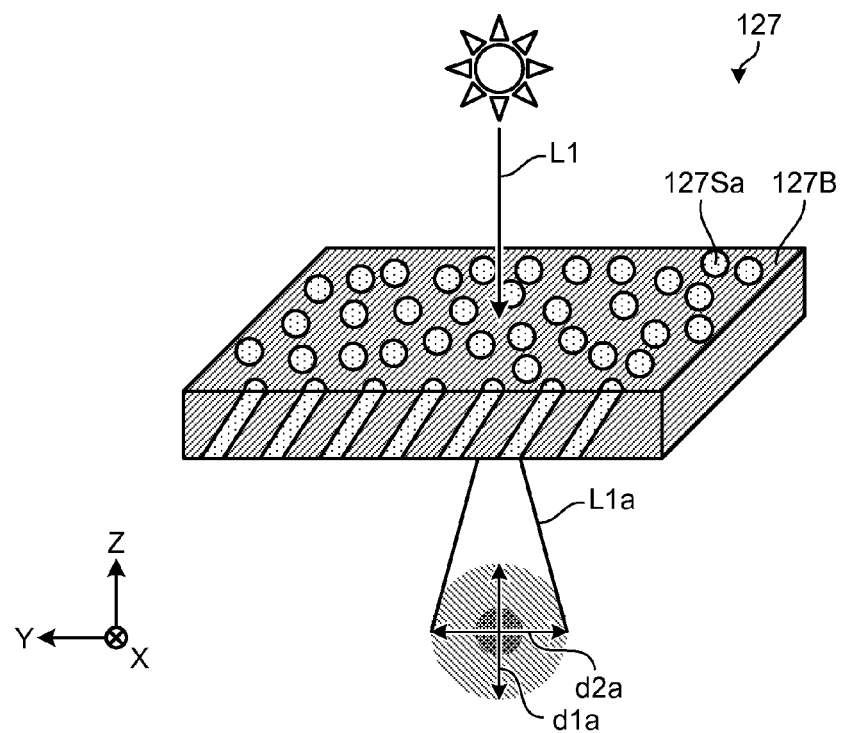
FIG. 7 is a schematic for explaining a function of another anisotropic scattering member.
Figure 8:
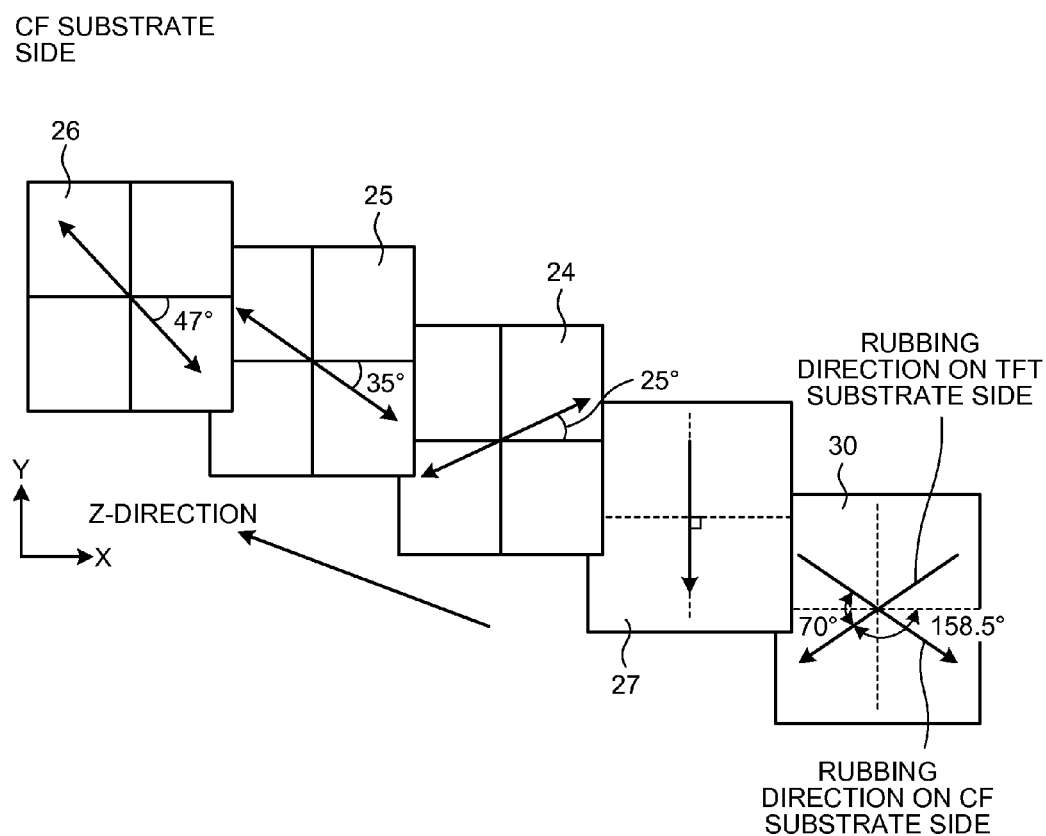
FIG. 8 is a schematic of an example of optical design of the reflective LCD device.

FIG. 5 is a sectional view of an anisotropic scattering member. FIG. 6 is a schematic for explaining a function of the anisotropic scattering member. FIG. 7 is a schematic for explaining a function of another anisotropic scattering member. FIG. 8 is a schematic of an example of optical design of the reflective LCD device.

The reflective LCD device 1 includes the sheet-like anisotropic scattering member 27 that scatters light. The anisotropic scattering member 27 is arranged at a position further in a traveling direction of light reflected by the reflective electrode 15 than the liquid-crystal layer 30. More specifically, the reflective LCD device 1 is provided with the anisotropic scattering member 27 between the second substrate 23 and the quarter-wave plate 24. The anisotropic scattering member 27 is an anisotropic layer that scatters light reflected by the reflective electrode 15. A light control film (LCF) may be used as the anisotropic scattering member 27, for example.

The anisotropic scattering member 27 is an anisotropic scattering layer that scatters light incident in a specific direction. If light is incident in the specific direction from the polarizing plate 26 side with respect to the second substrate 23, the anisotropic scattering member 27 transmits the incident light almost without scattering the light. The anisotropic scattering member 27 significantly scatters light reflected and returned by the reflective electrode 15.

As illustrated in FIG. 5, the anisotropic scattering member 27 includes two types of areas (a first area 27B and a second area 27S) having different refractive indexes. The anisotropic scattering member 27 has a louver structure in which a plurality of plate-like second areas 27S are arranged at predetermined intervals in the first area 27B as illustrated in FIG. 6. In the present embodiment, the first area 27B is made of a material having a refractive index lower than that of the second area 27S. In other words, the first area 27B is made of a material having a relatively low refractive index and serves as a low refractive index area in the anisotropic scattering member 27. The second area 27S is made of a material having a relatively high refractive index and serves as a high refractive index area in the anisotropic scattering member 27. In the present embodiment, P2 denotes an arrangement interval between the second areas 27S adjacent in the Y-direction, that is, an arrangement interval between the adjacent high refractive index areas. The arrangement interval between the second areas 27S corresponds to a distance between the centers of the second areas 27S adjacent in the Y-direction.

In the anisotropic scattering member 27, the first area 27B and the second area 27S extend in the thickness direction and are inclined in a predetermined direction, for example. The anisotropic scattering member 27 is formed by irradiating a resin sheet that is a mixture of two or more types of photopolymerizable monomers or oligomers having different refractive indexes with ultraviolet rays in an oblique direction, for example. Materials used for the first area 27B and the second area 27S will be described later. The anisotropic scattering member 27 may have another structure different from the structure described above and may be manufactured by another method different from the method described above. The anisotropic scattering member 27 may be formed of one layer or a plurality of layers. In the case where the anisotropic scattering member 27 is formed of a plurality of layers, the layers may have the same structure or structures different from one another.

The anisotropic scattering member 27 scatters external light L1 when the external light L1 is incident in a first predetermined direction with respect to the second substrate 23. The anisotropic scattering member 27 transmits external light L2 when the external light L2 is incident in a second predetermined direction. The anisotropic scattering member 27 transmits the external light L2 when the external light L2 is incident in the second predetermined direction and then scatters light reflected by the reflective electrode 15 among the transmitted light in a predetermined range about a scattering central axis. The external light L2 is parallel light incident on the polarizing plate 26 of the second substrate 23. The external light L2 may be non-polarized light or polarized light. Similarly, if light is incident in directions opposite to those of the external light L1 and L2, the anisotropic scattering member 27 scatters light incident in one direction with respect to the second substrate 23 and transmits light incident in another direction. Specifically, the anisotropic scattering member 27 scatters light L4 when the light L4 is incident in the fourth predetermined direction with respect to the second substrate 23. The anisotropic scattering member 27 transmits external light L3 when the light L3 is incident in the third predetermined direction. The first and fourth predetermined directions are the same direction except that the extending directions thereof are opposite to each other by 180 degrees. The second and third predetermined directions are the same direction except that the extending directions thereof are opposite to each other by 180 degrees. The light simply needs to be scattered while passing through the anisotropic scattering member 27. The light may be scattered when being incident on the anisotropic scattering member 27 or when exiting therefrom, or may be scattered through the path.

The anisotropic scattering member 27 has the louver structure. The anisotropic scattering member 27 scatters the external light L1 into scattered light L1a as illustrated in FIG. 6. The scattered light L1a is formed into an elliptical shape having a diameter d1 extending along the long-side direction of the first area 27B and the second area 27S as the minor axis and a diameter d2 extending along the short-side direction of the first area 27B and the second area 27S (array direction of the first area 27B and the second area 27S) as the major axis. Similarly, the anisotropic scattering member 27 scatters light reflected by the reflective electrode 15 into scattered light having an elliptical shape.

The scattering central axis of the anisotropic scattering member 27 is preferably directed to a main viewing angle direction, for example. Alternatively, the scattering central axis may be directed to another direction different from the main viewing angle direction. In both cases, the use of the anisotropic scattering member 27 make the luminance in the main viewing angle direction highest because of the advantageous effects of the anisotropic scattering member 27. In other words, the direction of the scattering central axis simply needs to be set so as to make the reflectance highest. The main viewing angle corresponds to an azimuth in which a user of the reflective LCD device 1 sees a video display surface when using the reflective LCD device 1. In the case of the video display surface having a square shape, the main viewing angle corresponds to an azimuth orthogonal to the side closest to the user among the sides of the video display surface. In the reflective LCD device 1 according to the present embodiment, the main viewing angle direction is set on the Y-Z plane. The main viewing angle direction preferably contains a direction parallel to the Z-direction and is included in directions rotated to both sides about the Z-direction by 30°.

While the anisotropic scattering member 27 according to the present embodiment has a louver structure, the structure thereof is not limited thereto. In an anisotropic scattering member 127 illustrated in FIG. 7, columnar second areas 127Sa are arranged in a first area 127B. The second area 127Sa may have a columnar structure in this manner. The anisotropic scattering member 127 illustrated in FIG. 7 scatters the external light L1 into scattered light L1a. The scattered light L1a is formed into a circular shape in which a diameter d1a and a diameter d2a are the same in length as illustrated in FIG. 7. Similarly, the anisotropic scattering member 127 scatters light reflected by the reflective electrode 15 into scattered light having a circular shape.

FIG. 8 is a schematic of an example of optical design of the reflective LCD device. FIG. 8 illustrates axial directions of the liquid-crystal cell (liquid-crystal layer 30) and components of the second panel unit 20. Specifically, FIG. 8 illustrates the axial directions of the second panel unit 20, including an absorption axis direction of the polarizing plate 26, a slow axis direction of the anisotropic scattering member 27, a slow axis direction of the half-wave plate 25, a slow axis direction of the quarter-wave plate 24, and rubbing directions of the liquid-crystal cell on the TFT substrate side and the CF substrate side.

1-7. Front Light Unit

Figure 9:
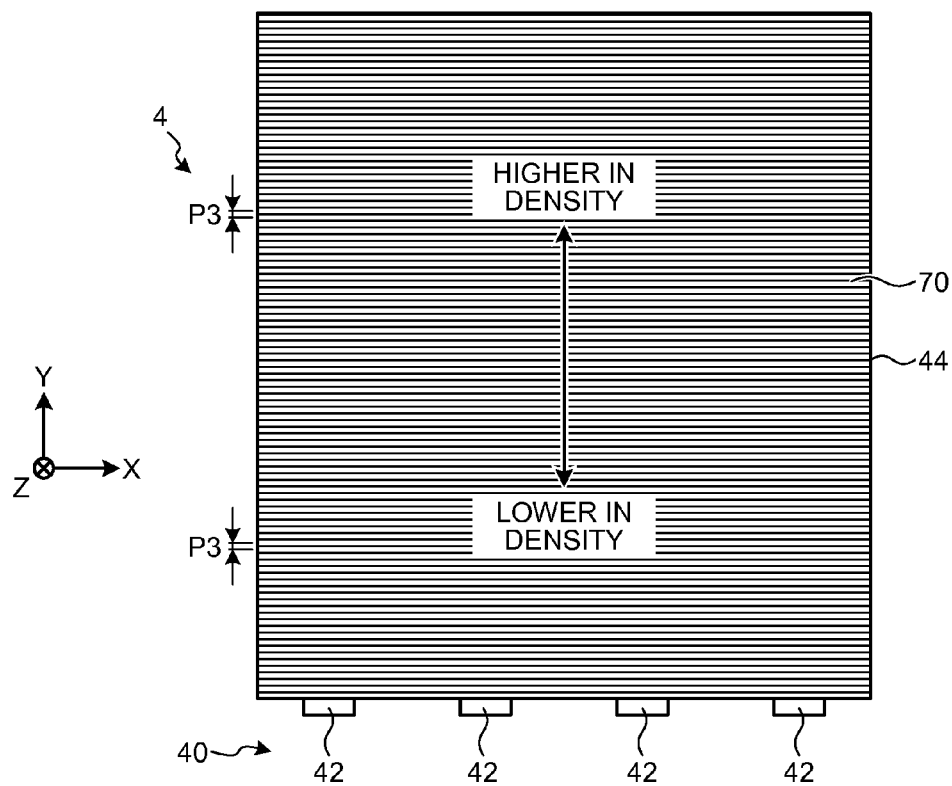
FIG. 9 is a top view of a schematic configuration of a front light unit.
Figure 10:
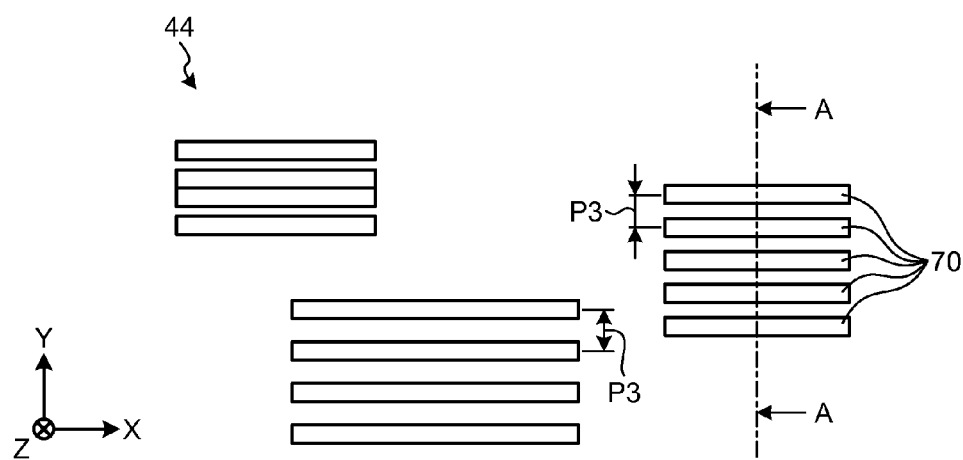
FIG. 10 is an enlarged top view of a schematic configuration of a light guide plate.
Figure 11:
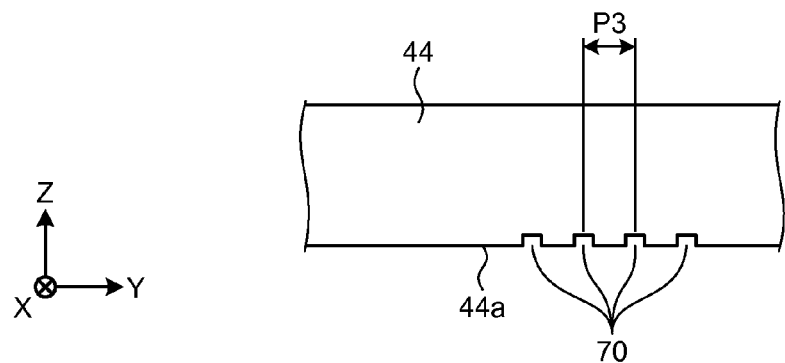
FIG. 11 is a sectional view along line A-A of FIG. 10.
Figure 12:
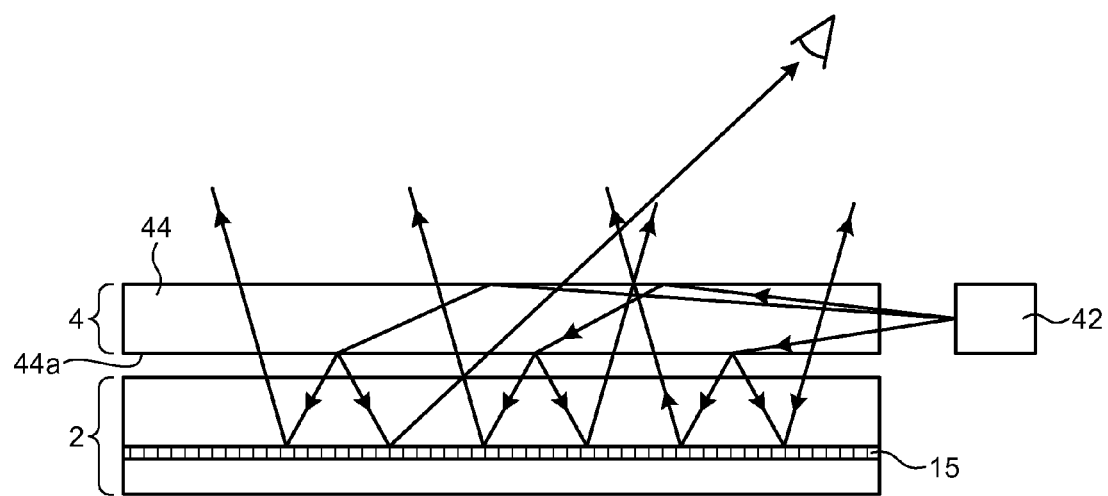
FIG. 12 is a view for explaining a function of the front light unit.

The front light unit 4 will now be described with reference to FIG. 9 to FIG. 12 in addition to FIG. 1. FIG. 9 is a top view of a schematic configuration of the front light unit. FIG. 10 is an enlarged top view of a schematic configuration of the light guide plate. FIG. 11 is a sectional view along line A-A of FIG. 10. FIG. 12 is a view for explaining a function of the front light unit.

As illustrated in FIG. 1, the front light unit 4 is arranged on the surface that displays an image of the reflective LCD panel 2, that is, the surface of the second substrate 23 on which external light is incident and from which light reflected by the reflective electrode 15 is output. The front light unit 4 includes the light source 40, the light guide plate 44, and an adhesive member 46.

As illustrated in FIG. 9, the light source 40 includes a plurality of light emitting diodes (LEDs) 42. The LEDs 42 are arranged in a line in a manner facing one of the side surfaces of the light guide plate 44. While the present embodiment uses the LEDs 42 as the light source 40, another light source, such as a fluorescent tube, may be used.

The light guide plate 44 is a transparent plate-like member and is disposed above the surface (display surface) of the second substrate 23 of the reflective LCD panel 2. In the present embodiment, the light source 40 is arranged at a position facing one of the side surfaces on the end of the light guide plate 44 in the Y-direction. The light guide plate 44 covers the entire surface of the second substrate 23. The light guide plate 44 has a number of grooves 70 formed on a surface 44a facing the surface (display surface) of the second substrate 23.

As illustrated in FIG. 9 to FIG. 11, the grooves 70 have an elongated shape in which the X-direction corresponds to the longitudinal direction, whereas the Y-direction corresponds to the short direction. The X-direction corresponds to a direction parallel to the array direction of the light source 40, that is, a direction orthogonal to the direction in which light output from the light source 40 travels. The Y-direction corresponds to a direction orthogonal to the array direction of the light source 40, that is, the direction in which light output from the light source 40 travels. The grooves 70 are arranged adjacent to each other in the Y-direction. Each groove 70 may be formed on the whole area in the X-direction of the surface 44a. In the present embodiment, as illustrated in FIG. 10, the grooves 70 are each formed on a part of the surface 44a. The light guide plate 44 has a plurality of grooves 70 in the X-direction.

In the light guide plate 44, an interval (an arrangement interval or a pitch) P3 between the grooves 70 adjacent in the Y-direction varies depending on the position in the Y-direction. The arrangement interval between the grooves 70 corresponds to a distance between the centers of the adjacent grooves 70. In the case where units each including a plurality of grooves 70 are separately arranged as illustrated in FIG. 10, the interval between the grooves 70 simply needs to be compared in the respective unit. If the grooves 70 are arranged away from each other by equal to or larger than 1 mm in the Y-direction or the X-direction, the grooves 70 can be assumed to belong to different units on the light guide plate 44. Specifically, the interval P3 increases as closer to the light source 40 in the Y-direction and decreases as farther away from the light source 40 on the light guide plate 44 as illustrated in FIG. 9. On the light guide plate 44, the individual intervals P3 may vary irregularly as long as the average value of the intervals P3 between the grooves 70 within a certain range in the Y-direction, for example, within a range of 1 mm varies depending on the position. In other words, the light guide plate 44 has a lower arrangement density as closer to the light source 40 in the Y-direction and has a higher arrangement density as farther away from the light source 40 as illustrated in FIG. 9.

The pitch P3 between the grooves 70 in the Y-direction is set to equal to or smaller than 100 μm on the light guide plate 44. By setting the pitch P3 between the grooves 70 to equal to or smaller than 100 μm on the light guise plate 44, it is possible to make the line of the pitch inconspicuous on the light guide plate and to reflect and scatter light appropriately. The pitch P3 between the grooves 70 in the Y-direction is preferably set to equal to or smaller than 20 μm on the light guide plate 44. By setting the pitch P3 between the grooves 70 to equal to or smaller than 20 μm on the light guise plate 44, it is possible to reflect and scatter light more appropriately.

The grooves 70 of the light guide plate 44 can be formed by nanoimprint. Formation of the grooves 70 of the light guide plate 44 by nanoimprint facilitates formation of the grooves 70 on the surface 44a. The method for forming the grooves 70 of the light guide plate 44 is not particularly restricted. The grooves 70 may be formed by a semiconductor etching process or machining.

The adhesive member 46 is arranged between the surface 44a of the light guide plate 44 and the second substrate 23 to bond the light guide plate 44 to the second substrate 23. The adhesive member 46 is a transparent adhesive. The adhesive member 46 bonds the surface 44a of the light guide plate 44 to the second substrate 23 with no air layer interposed between the surface 44a of the light guide plate 44 and the second substrate 23.

As illustrated in FIG. 12, the LEDs 42 of the light source 40 output light to the front light unit 4. The light thus output enters inside the light guide plate 44 from the end surface of the light guide plate 44. The light guide plate 44 guides the light entering inside thereof in the Y-direction. If the light traveling in the light guide plate 44 reaches the side opposite to the surface 44a and the incident angle of the light is equal to or smaller than a predetermined angle, the light is reflected. If the light traveling in the light guide plate 44 reaches the surface 44a, the light is reflected and scattered by recesses and protrusions formed by the grooves 70 and is output toward the reflective LCD panel 2. The front light unit 4 has the grooves 70 formed on the surface 44a of the light guide plate 44 as described above. The front light unit 4 reflects and scatters light received from the light source 40, thereby outputting the light toward the reflective LCD panel 2. This can make light incident on the reflective LCD panel 2 even when the front light unit 4 that outputs light is arranged on the display surface side of the reflective LCD panel 2.

The light output toward the reflective LCD panel 2 passes through the reflective LCD panel 2 and is reflected by the reflective electrode 15. The light then passes through the light guide plate 44 and reaches the eyes of an observer. The light output toward the reflective LCD panel 2 is switched between a portion blocked and not to be output and a portion to be output depending on the state of the liquid crystal at a position where the light passes through the reflective LCD panel 2 as described above. Thus, an image is displayed on the display surface.

1-8. Functions of the Reflective LCD Device

The reflective LCD device 1 has the configuration described above. In the reflective LCD device 1, a number of grooves 70 are formed on the surface 44*a* of the light guide plate 44 at a pitch in the Y-direction of equal to or smaller than 100 μm, thereby outputting light in the light guide plate 44 toward the reflective LCD panel 2. This can make light whose light distribution is adjusted with higher accuracy incident on the reflective LCD panel 2. In the reflective LCD device 1, the grooves 70 have a shorter width in a direction (Y-Z plane) in which the viewing angle direction is inclined and have a longer width in a direction (Y-X plane) orthogonal to the direction in which the main viewing angle direction is inclined. With this configuration, it is possible to scatter light output from the light source appropriately.

In the reflective LCD device 1, the anisotropic scattering member is provided to the reflective LCD panel 2, thereby outputting a larger amount of light in the main viewing angle direction. This can increase the viewing angle in the direction (Y-Z plane) in which the main viewing angle direction is inclined and decrease the viewing angle in the direction (Y-X plane) orthogonal to the direction in which the main viewing angle direction is inclined. Providing the anisotropic scattering member with high diffusibility makes it possible to diffuse light, thereby suppressing moire.

In the reflective LCD device 1, the relation between the interval (pitch) P1 between the unit pixels and an average P2*a* of the interval (pitch or the arrangement interval) P2 between the high refractive index areas of the anisotropic scattering member 27 satisfies P2*a*<P1. By setting the average P2*a* smaller than the interval P1 in this manner, it is possible to scatter light passing through the unit pixels. This can suppress moire.

In the reflective LCD device 1, the reflective electrodes 15 of the first substrate 14 are formed on the planarizing film 14*b*, thereby suppressing formation of recesses and protrusions on the reflective electrodes 15. This can suppress moire caused by reflection on the reflective electrodes 15.

In the reflective LCD device 1, the interval (pitch or the arrangement interval) P1 between the unit pixels is set larger than an average P3*a* of the interval (pitch or the arrangement interval) P3 between the grooves 70. In other words, it is preferable that P1>P3*a* be satisfied. This makes it possible to scatter light passing through the unit pixels, thereby suppressing moire.

In the reflective LCD device 1, the interval (pitch or the arrangement interval) P1 between the unit pixels is set to 20 μm, the average P2*a* of the interval (pitch or the arrangement interval) P2 between the high refractive index areas of the anisotropic scattering member 27 is set to 3 μm, and the average P3*a* of the interval (pitch or the arrangement interval) P3 between the grooves 70 is set to 6 μm, for example.

In the reflective LCD device 1, the arrangement density of the grooves 70 of the light guide plate 44 preferably becomes lower as closer to the light source 40 as in the present embodiment. This makes it possible to make light output from the light source 40 incident on the reflective LCD panel 2 more uniformly.

In the reflective LCD device 1, the grooves 70 of the light guide plate 44 are preferably arranged irregularly. This can suppress moire with higher probability.

In the reflective LCD device 1, the light guide plate 44 preferably outputs light toward the reflective LCD panel 2 with the following distribution: the illuminance of light reflected by the reflective electrodes and directed in the main viewing angle direction is higher than that of light in other directions. The distribution of light output toward the reflective LCD panel 2 can be adjusted by the arrangement and the shape of the grooves 70 of the light guide plate 44.

2. Electronic Apparatuses

The reflective LCD device according to the present disclosure is applicable to display units (display devices) of any types of electronic apparatuses that display a video signal received by the electronic apparatuses or a video signal generated in the electronic apparatuses as an image or video.

The reflective LCD device according to the present disclosure is preferably applied to display units (display devices) of portable electronic apparatuses frequently used outdoors among all types of electronic apparatuses. Examples of the portable electronic apparatuses include, but are not limited to, portable information apparatuses, such as digital cameras, video cameras, personal digital assistants (PDA), game machines, notebook personal computers, and electronic books, portable communication apparatuses, such as mobile phones, etc.

As is clear from the description of the embodiment, the reflective LCD device according to the present disclosure can perform transmissive display while maintaining reflective display performance equivalent to that of a reflective display device. As a result, the reflective LCD device according to the present disclosure can fully exhibit the characteristics of a reflective LCD device, that is, less power consumption is required and the screen is easy to see under a bright environment. By applying the reflective LCD device according to the present disclosure to a display unit of any types of electronic apparatuses, specifically, of portable electronic apparatuses, it is possible to significantly reduce power consumption of the portable electronic apparatuses.

The following describes electronic apparatuses provided with the reflective LCD device according to the present disclosure as a display unit, that is, specific examples of an electronic apparatus according to the present disclosure.

Figure 13A:
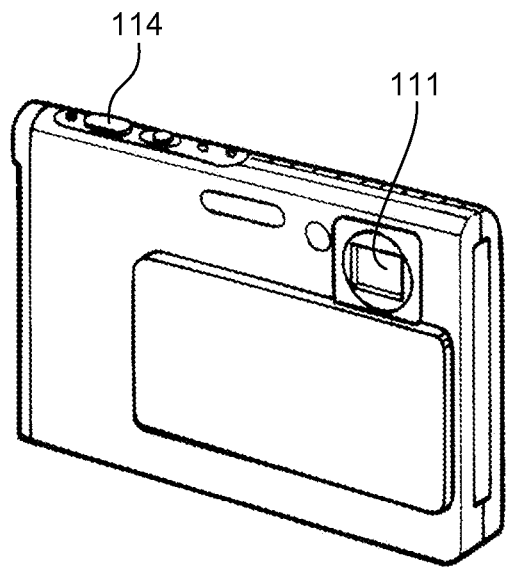
FIG. 13A is a perspective view of an appearance of a digital camera to which the present disclosure is applied.
Figure 13B:
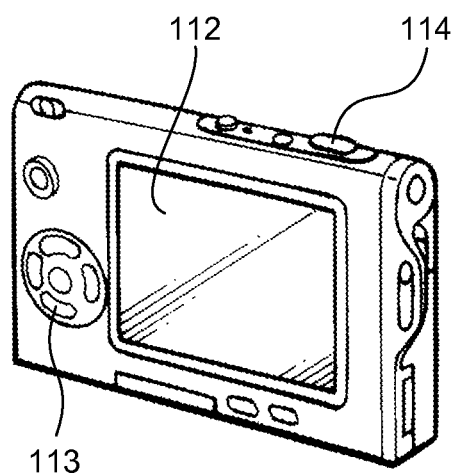
FIG. 13B is another perspective view of the appearance of the digital camera to which the present disclosure is applied.

FIG. 13A is a perspective view of an appearance of a digital camera to which the present disclosure is applied viewed from the front side. FIG. 13B is a perspective view of the appearance of the digital camera viewed from the rear side. The digital camera according to the present application example includes a light-emitting unit 111 that outputs flashlight, a display unit 112, a menu switch 113, and a shutter button 114. The digital camera is manufactured by applying the reflective LCD device according to the present disclosure to the display unit 112.

Figure 14:
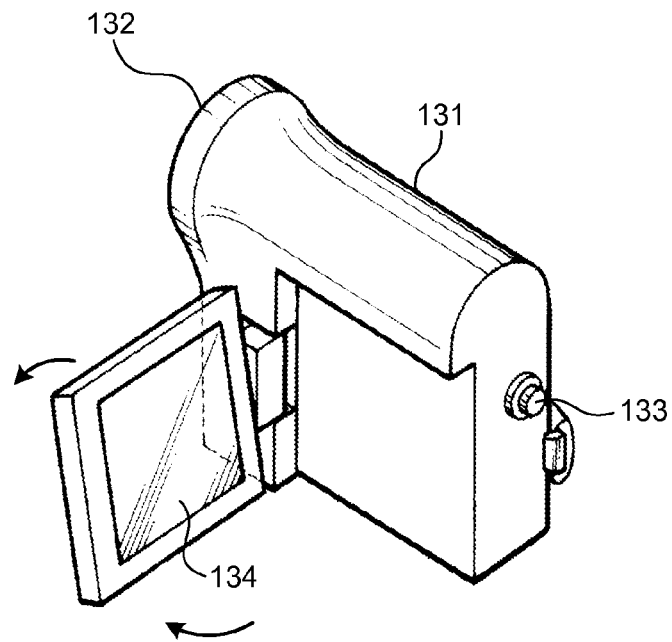
FIG. 14 is a perspective view of an appearance of a video camera to which the present disclosure is applied.

FIG. 14 is a perspective view of an appearance of a video camera to which the present disclosure is applied. The video camera according to the present application example includes a main body 131, a lens 132 arranged on the side surface facing the front to photograph a subject, a start/stop switch 133 used in photographing, and a display unit 134. The video camera is manufactured by applying the reflective LCD device according to the present disclosure to the display unit 134.

Figure 15:
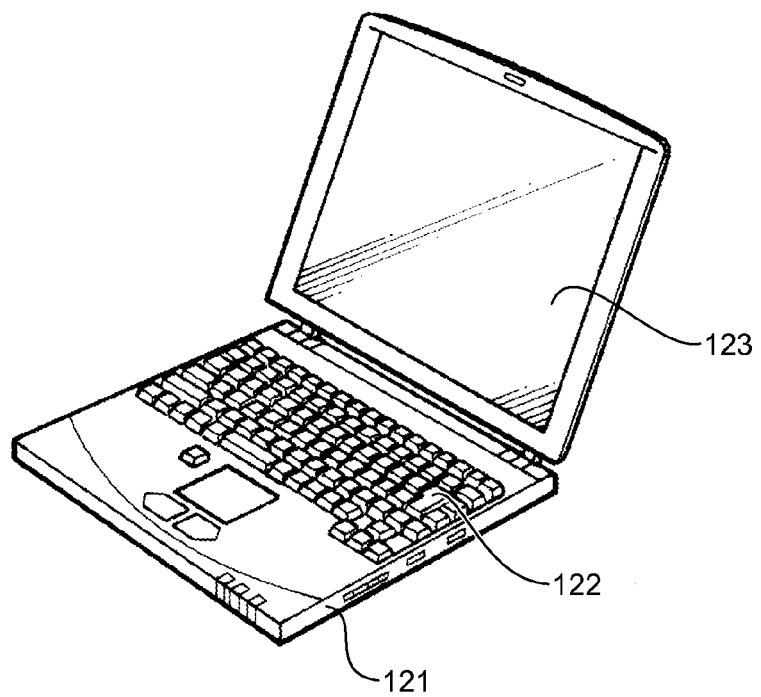
FIG. 15 is a perspective view of an appearance of a notebook personal computer to which the present disclosure is applied.

FIG. 15 is a perspective view of an appearance of a notebook personal computer to which the present disclosure is applied. The notebook personal computer according to the present application example includes a main body 121, a keyboard 122 operated when inputting characters and the like, and a display unit 123 that displays an image. The notebook personal computer is manufactured by applying the reflective LCD device according to the present disclosure to the display unit 123.

Figure 16A:
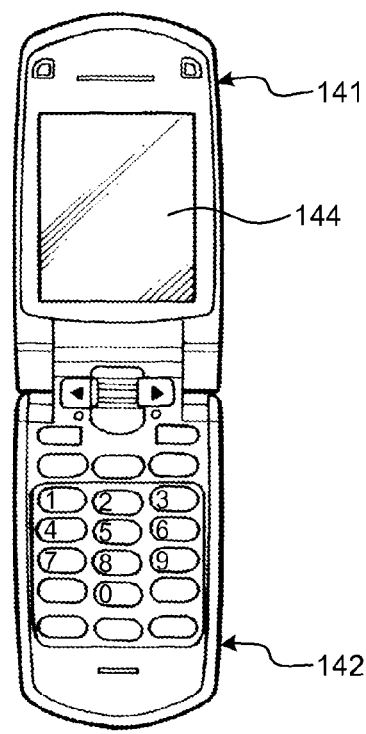
FIG. 16A is a front view of a mobile phone to which the present disclosure is applied in an unfolded state.
Figure 16B:
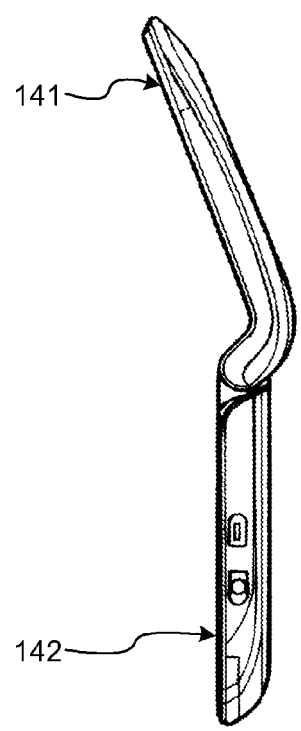
FIG. 16B is a side view of the mobile phone to which the present disclosure is applied.
Figure 16C:
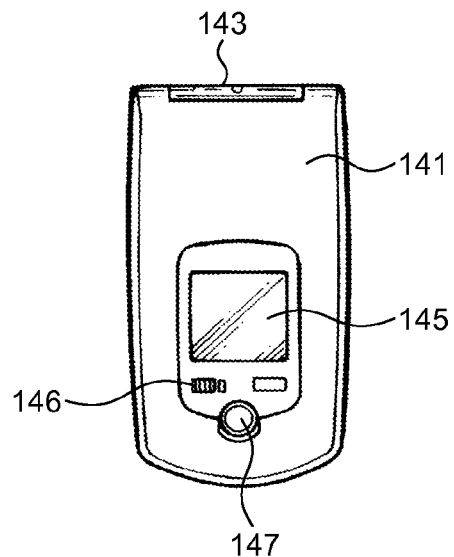
FIG. 16C is a front view of the mobile phone to which the present disclosure is applied in a folded state.
Figure 16D:
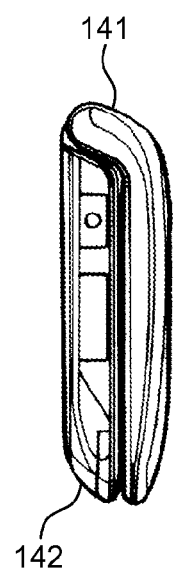
FIG. 16D is a left side view of the mobile phone to which the present disclosure is applied.
Figure 16E:
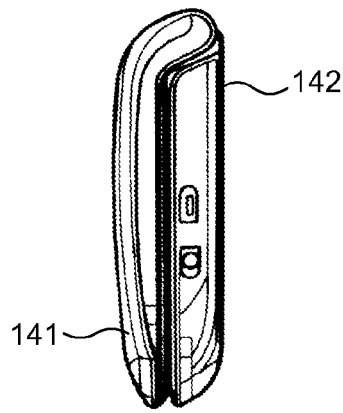
FIG. 16E is a right side view of the mobile phone to which the present disclosure is applied.
Figure 16F:
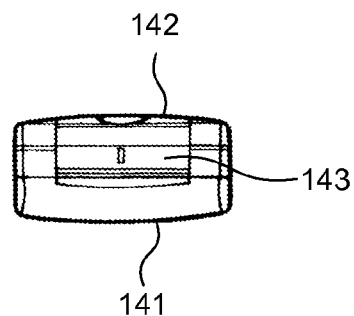
FIG. 16F is a top view of the mobile phone to which the present disclosure is applied.
Figure 16G:
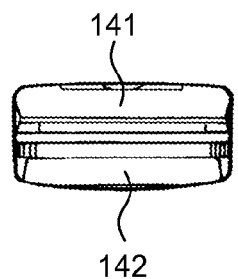
FIG. 16G is a bottom view of the mobile phone to which the present disclosure is applied.

FIG. 16A to FIG. 16G are views of an appearance of a portable communication apparatus, such as a mobile phone, to which the present disclosure is applied. FIG. 16A is a front view of the mobile phone in an unfolded state, and FIG. 16B is a side view. FIG. 16C is a front view of the mobile phone in a folded state, FIG. 16D is a left side view, FIG. 16E is a right side view, FIG. 16F is a top view, and FIG. 16G is a bottom view.

The mobile phone according to the present application example includes an upper housing 141, a lower housing 142, a connection (a hinge in this example) 143, a display 144, a sub-display 145, a picture light 146, and a camera 147. The mobile phone according to the present application example is manufactured by applying the reflective LCD device according to the present disclosure to the display 144 and/or the sub-display 145.

Figure 17:
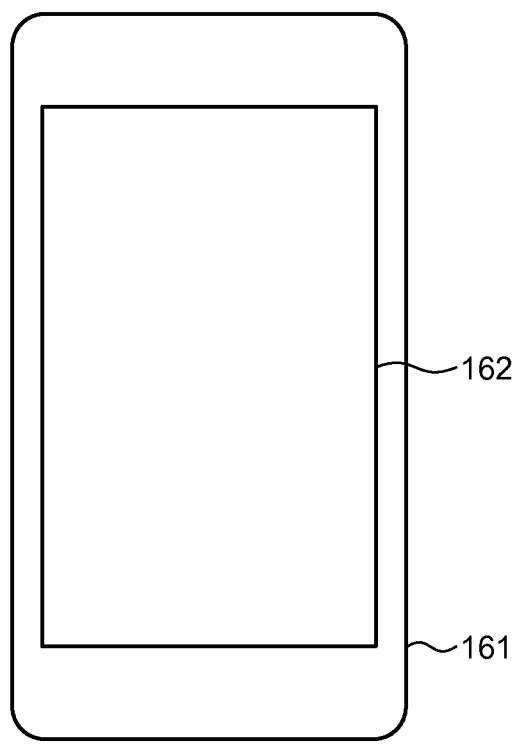
FIG. 17 is a front view of another portable electronic apparatus to which the present disclosure is applied.

FIG. 17 is a front view of another portable electronic apparatus to which the present disclosure is applied. A portable electronic apparatus according to the present application example operates as a mobile computer, a multifunctional mobile phone, a mobile computer capable of making a voice call, or a mobile computer capable of performing communications. The portable electronic apparatus is a portable information terminal, which may be called a smartphone or a tablet terminal. The portable information terminal is provided with a display unit 162 on the surface of a housing 161, for example. The display unit 162 corresponds to the reflective LCD device 1 according to the present embodiment. The display unit 162 is provided with what is called a touch panel that detects an object in the vicinity of the LCD panel.

3. Aspects of the Present Disclosure

The present disclosure includes following aspects.

(1) A reflective liquid-crystal display device comprising:
a liquid-crystal panel including
a reflective electrode provided for each of a plurality of units,
a first substrate provided with the reflective electrode,
a transparent electrode facing the reflective electrode,
a second substrate provided with the transparent electrode,
a liquid-crystal layer provided between the first substrate and the second substrate, and
a sheet-like anisotropic scattering member laminated on the second substrate and having low refractive index areas and high refractive index areas with a refractive index higher than that of the low refractive index areas; and
a front light unit including
a light guide plate laminated on a surface on the second substrate side of the liquid-crystal panel and having a number of grooves formed on a surface facing the liquid-crystal panel at a pitch of equal to or smaller than 100 μm and
a light source that makes light incident on the light guide plate, wherein
an arrangement interval of the unit pixels is larger than an average of an arrangement interval of the high refractive index area of the anisotropic scattering member.

(2) The reflective liquid-crystal display device according to (1), wherein the reflective electrode is formed on a planarizing film in the first substrate.

(3) The reflective liquid-crystal display device according to (1), wherein the arrangement interval of the unit pixels is larger than an average of an arrangement interval between the grooves of the light guide plate.

(4) The reflective liquid-crystal display device according to (1), wherein arrangement density of the grooves of the light guide plate becomes lower as closer to the light source.

(5) The reflective liquid-crystal display device according to (1), wherein the grooves of the light guide plate are arranged irregularly.

(6) The reflective liquid-crystal display device according to (1), wherein the grooves of the light guide plate are formed such that a direction parallel to a side facing the light source corresponds to a longitudinal direction and are arranged side by side in a direction orthogonal to the side facing the light source.

(7) An electronic apparatus comprising the reflective liquid-crystal display device according to (1).

The reflective liquid-crystal display device having the configuration described above and the electronic apparatus including the reflective liquid-crystal display device are provided with the light guide plate having a number of grooves formed on the surface facing the liquid-crystal panel at a pitch of equal to or smaller than 100 μm. As a result, it is possible to adjust distribution of light incident from the front light unit toward the liquid-crystal display panel with higher accuracy. This makes it possible to output a larger amount of light in a target direction, thereby further averaging distribution of light traveling in the direction from the entire display surface. The anisotropic scattering member is laminated, and the pitch between the unit pixels is set larger than the average of the arrangement interval between the high refractive index areas of the anisotropic scattering member. This can suppress moire in the case where the reflective liquid-crystal display device and the electronic apparatus are provided with the light guide plate having a number of grooves formed on the surface facing the liquid-crystal panel at a pitch of equal to or smaller than 100 μm. Thus, the reflective liquid-crystal display device and the electronic apparatus can display a high-quality image.

The present disclosure can suppress moire in the case where the reflective LCD device has a configuration provided with a front light unit including a light guide plate having fine recesses formed on its surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A reflective liquid-crystal display device comprising:
a liquid-crystal panel including
a plurality of reflective electrodes each provided for each of unit pixels,
a first substrate provided with the reflective electrodes,
a transparent electrode facing the reflective electrodes,
a second substrate provided with the transparent electrode,
a liquid-crystal layer provided between the first substrate and the second substrate, and
a sheet-like anisotropic scattering member that is laminated on the second substrate and that has low refractive index areas and high refractive index areas with a refractive index higher than that of the low refractive index areas, the high refractive index areas being surrounded by the low refractive index areas, and each of the high refractive index areas having a cylindrical shape with a same diameter and being inclined to a normal line direction of an upper surface of the anisotropic scattering member; and
a front light unit including
a light guide plate that is laminated on a second substrate side surface of the liquid-crystal panel and that has a plurality of grooves formed on a surface facing the liquid-crystal panel at a groove pitch of equal to or smaller than 100 μm, the grooves extending in a first direction and being arranged in a second direction crossing the first direction, and
a light source that makes light incident on the light guide plate, wherein
an arrangement interval of the unit pixels is larger than an average arrangement interval of the grooves in the second direction,
the high refractive index areas are irregularly arranged in the sheet-like anisotropic scattering member such that first high-index-area distances, which are distances between centers of high refractive index areas next to each other in the second direction, are different in the upper surface of the sheet-like anisotropic scattering member in the second direction and that an average of the first high-index-area distances is smaller than the arrangement interval of the unit pixels.

2. The reflective liquid-crystal display device according to claim 1, wherein the reflective electrode is formed on a planarizing film in the first substrate.

3. The reflective liquid-crystal display device according to claim 1, wherein an arrangement density of the grooves of the light guide plate becomes lower as closer to the light source.

4. The reflective liquid-crystal display device according to claim 1, wherein the grooves of the light guide plate are arranged irregularly.

5. The reflective liquid-crystal display device according to claim 1, wherein the grooves of the light guide plate are formed such that a longitudinal direction of the grooves is the first direction that is parallel to a side of the light guide plate facing the light source, and
the grooves are arranged side by side in the second direction orthogonal to the side facing the light source.

6. The reflective liquid-crystal display device according to claim 5, wherein
the high refractive index areas are irregularly arranged in the sheet-like anisotropic scattering member such that second high-index-area distances, which are distances between centers of high refractive index areas next to each other in the first direction, are different in the upper surface of the sheet-like anisotropic scattering member in the first direction.

7. An electronic apparatus comprising the reflective liquid-crystal display device according to claim 1.

* * * * *